July 11, 1961  R. CHAPMAN  2,992,152
METHOD OF FORMING A BOARD PRODUCT
Original Filed Feb. 14, 1955  7 Sheets-Sheet 1

INVENTOR.
RALPH CHAPMAN
BY
BUCKHORN, CHEATHAM & BLORE
ATTORNEYS

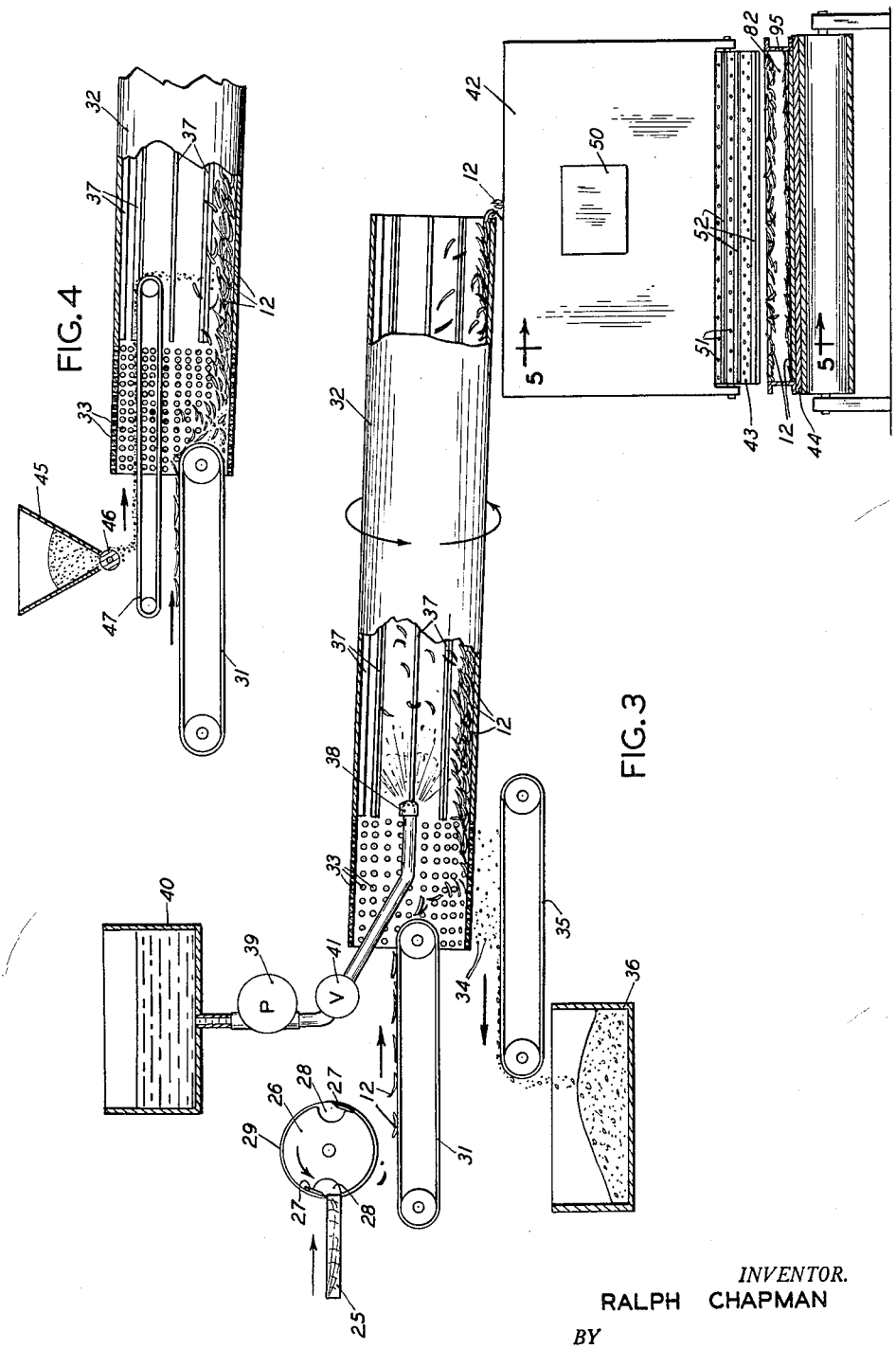

July 11, 1961 R. CHAPMAN 2,992,152
METHOD OF FORMING A BOARD PRODUCT
Original Filed Feb. 14, 1955 7 Sheets-Sheet 3

INVENTOR.
RALPH CHAPMAN
BY
Buckhorn and Cheatham
ATTORNEYS

July 11, 1961   R. CHAPMAN   2,992,152
METHOD OF FORMING A BOARD PRODUCT
Original Filed Feb. 14, 1955   7 Sheets-Sheet 4
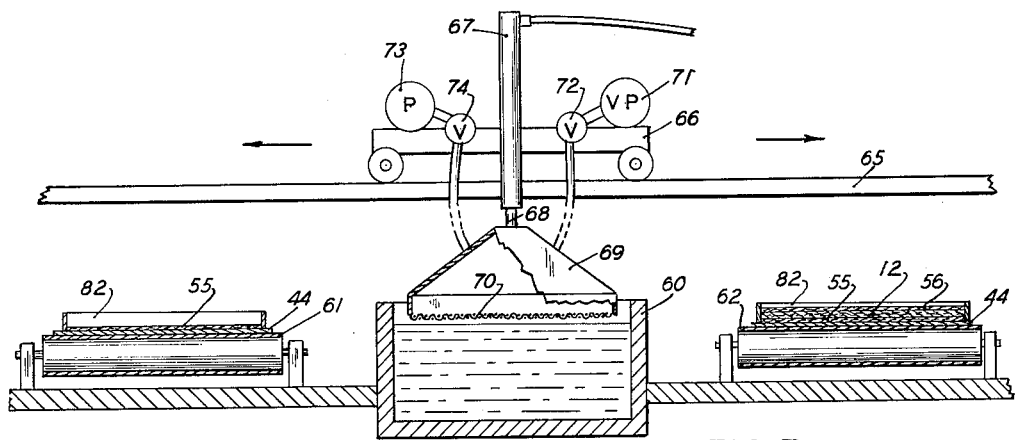
FIG. 7
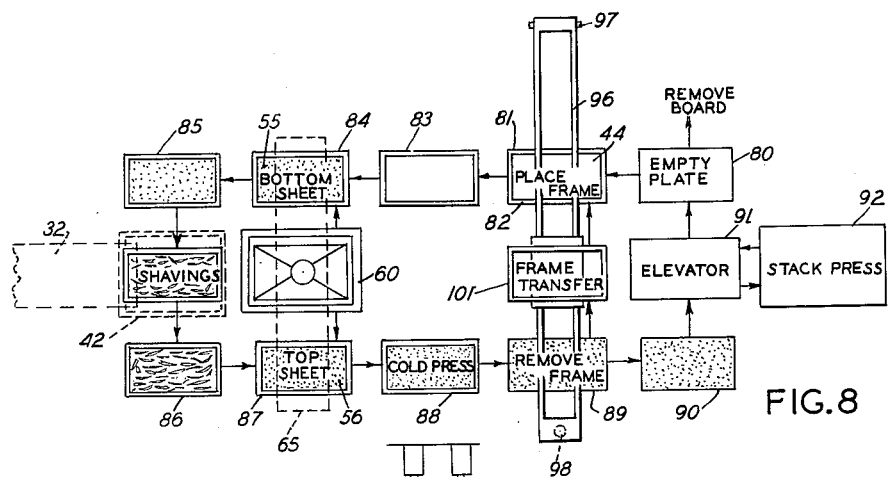
FIG. 8
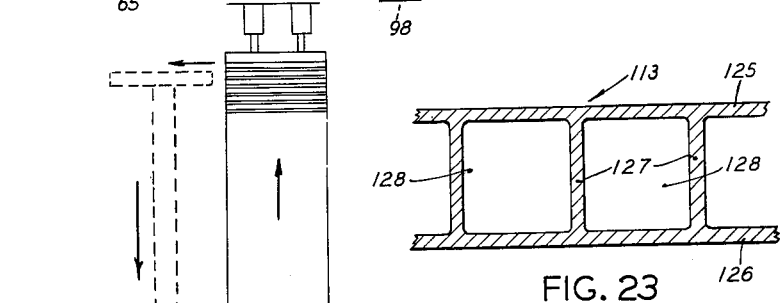
FIG. 9
FIG. 23
INVENTOR.
RALPH CHAPMAN
BY
Buckhorn and Cheatham
ATTORNEYS July 11, 1961 R. CHAPMAN 2,992,152
METHOD OF FORMING A BOARD PRODUCT
Original Filed Feb. 14, 1955 7 Sheets-Sheet 5
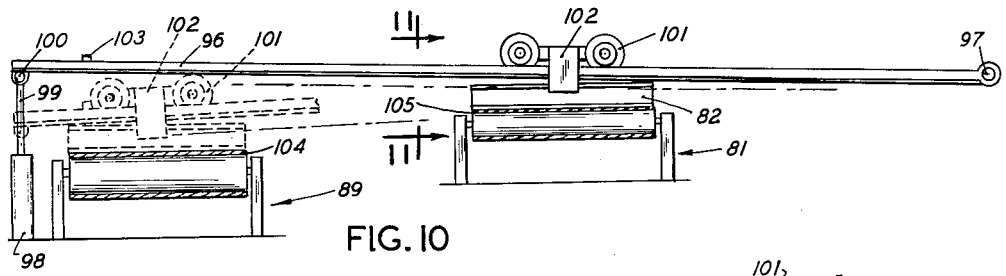
FIG. 10
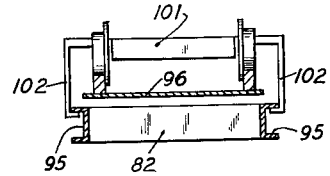
FIG. 11
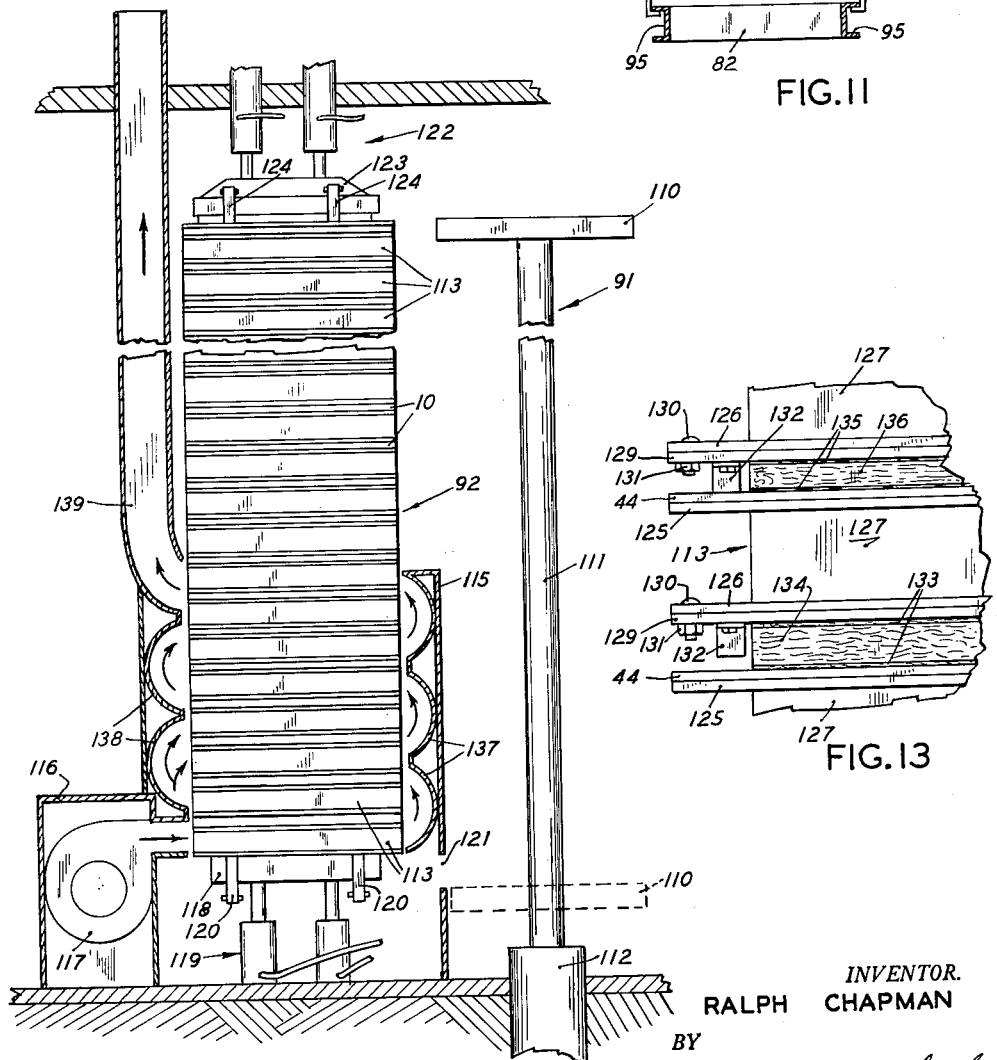
FIG. 12
FIG. 13
INVENTOR.
RALPH CHAPMAN
BY
Buckhorn and Cheatham
ATTORNEYS.

July 11, 1961 R. CHAPMAN 2,992,152
METHOD OF FORMING A BOARD PRODUCT
Original Filed Feb. 14, 1955 7 Sheets-Sheet 6

INVENTOR.
RALPH CHAPMAN
BY
BUCKHORN, CHEATHAM & BLORE
ATTORNEYS

July 11, 1961 R. CHAPMAN 2,992,152
METHOD OF FORMING A BOARD PRODUCT
Original Filed Feb. 14, 1955 7 Sheets-Sheet 7
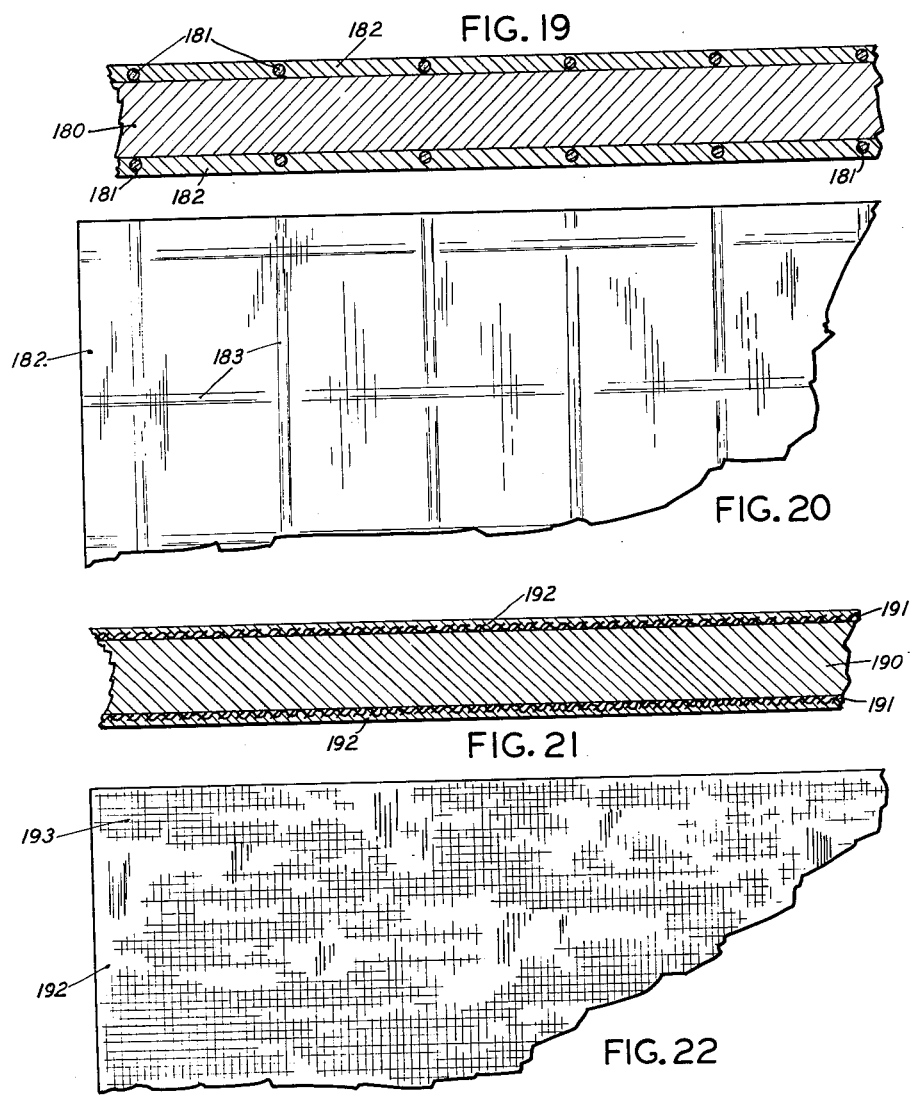
INVENTOR.
RALPH CHAPMAN
BY
Buckhorn and Cheatham
ATTORNEYS United States Patent Office
2,992,152
Patented July 11, 1961

2,992,152
METHOD OF FORMING A BOARD PRODUCT
Ralph Chapman, P.O. Box 229, Corvallis, Oreg.
Continuation of application Ser. No. 487,753, Feb. 14, 1955. This application Sept. 25, 1959, Ser. No. 842,528
8 Claims. (Cl. 154—100)

This application is a continuation of my prior application Serial No. 487,753, filed February 14, 1955, now abandoned.

My present invention relates to board products, all of such products being distinguishable from the prior art by having tough surface skins of irregular density composed of consolidated fibers, and by the fact that the product is relieved of internal stresses and hence has less tendency to warp than products made by prior methods. The core of the board may comprise compacted shavings, or any of the other board substitutes. The skin may be formed of mineral fibers such as asbestos or glass, vegetable fibers such as wood and cotton, synthetic fibers, and combinations of the various fibers.

A principal purpose of the present invention is to provide a board or panel which, regardless of its principal composition, has durable surface skins which may be painted, stained, or otherwise decorated, which may be left in its natural state, which board or panel may be used as the interior surfacing of buildings or exposed to the weather, and which has a minimum tendency to warp, swell, crack, check or contract.

A further object of the present invention is to provide a board substitute, which may be made of scrap lumber, inferior grades of veneer, or inferior pulp, or reclaimed paper, or groundwood containing pitch, knots, bark, and the like, yet will have an integral surface skin of good quality which is receptive to decorative material and adhesives, whereby the board substitutes may be used as surfacing materials, or as core stock for veneered furniture or the like.

In one form of my invention the principal object is to provide a medium density board which is structurally rigid for the purposes for which said boards are intended, such as wall paneling or sheathing, furniture core stock, and the like, and which will have a relatively smooth surface of good texture and which may be of decorative appearance. As a corollary of this object a further object of my invention is to utilize ordinarily wasted pieces of wood, such as mill scraps, slab wood, and the like, most of which are now burned at great economic loss.

A further object of my invention is to provide a substitute for plywood of any reasonable thickness, which may be economically made from waste scrap material and which will have adequate strength and rigidity, workability, and in some respects better qualities than plywood. For example, a medium density board made in accordance with my invention is about the same weight as plywood, less susceptible to swelling and warping, and possesses comparable insulating value. It has the advantage that it may be made in small plant, with automatic machinery requiring a minimum amount of labor, in any locality where scraps of lumber and waste wood are available, as distinguished from plywood which must be made in large mills suitably located with respect to sources of "peeler" logs. A major advantage of my invention is that there is no need for patching, grading or other expensive manual operations in the fabrication thereof.

Another object of my invention is to provide quality surfaced, possibly inherently decorative, plywood out of poor quality logs or mill waste. A fiber surfaced plywood panel manufactured in accordance with my invention may be made out of poor quality veneer, and yet will have strength, resistance to warping, swelling, checking and cracking, and surface characteristics equal to or superior to the highest grades of plywood as presently manufactured.

A further object of the present invention is to provide a method of making warp resisting, nonswelling, nonchecking, noncracking, board or plywood substitutes utilizing scrap or inferior materials, which products will have good surface qualities, strength and workability.

A further object of the present invention is to provide a method of fabricating such board products in which the fibrous materials are bound together by the use of adhesives, which is distinguished over prior art methods in that there is no necessity for applying a parting compound or lubricant to the surfaces of the caul plates or platens employed in the consolidation of the board. This object is achieved by limiting the adhesive to the core of the board, covering the core on both sides by an uncompacted layer of felted fibers in which there is no added adhesive, and then consolidating the whole assembly in a hot press.

The foregoing and other objects and advantages of the present invention will be more readily apparent from the inspection of the accompanying drawings, taken in connection with the following specification, wherein like numerals refer to like parts throughout, and in which several forms of the products produced are illustrated and described, essential portions of the machinery are schematically illustrated and described, and the method is illustrated and described.

In the drawings,
FIG. 1 is a plan view of a portion of one form of the product, comprising a fiber surfaced board having the ornamental and decorative appearance of "flake" board;

FIG. 3 is a schematic representation of a portion of the process and the equipment for making a medium density board such as illustrated in FIG. 2, when using a liquid adhesive;

FIG. 4 is a partial view, corresponding to FIG. 3, of a modification of the equipment arranged for using a dry, powdered adhesive;

FIG. 7 is a schematic representation of a portion of the equipment for making boards in accordance with the present invention, this portion comprising means for producing and placing fiber mats to create the surface skins of consolidated fibers;

FIG. 8 is a flow sheet diagram of a typical plant for producing various types of boards in accordance with the present invention;

FIG. 9 is a schematic diagram of a portion of the present invention comprising the hot press and associated elevator mechanism;

FIG. 10 is a schematic diagram illustrating a portion of the apparatus for transferring frames utilized in the formation of the board;

FIG. 11 is a substantially vertical section taken substantially along line 11—11 of FIG. 10;

FIG. 12 is a schematic diagram of the hot press and elevator;

FIG. 13 is an enlarged, schematic diagram of portions of the platens and material sandwiched therebetween passing through the hot press;

FIG. 19 is a schematic section through a typical board illustrating the formation of smooth surfaced boards reinforced with wire mesh;

FIG. 20 is a partial plan view illustrating the ornamental appearance of the board of FIG. 19;

FIG. 21 is a schematic cross section through a typical board having both surfaces reinforced with a fabric;

FIG. 22 is a partial plan view illustrating the ornamental appearance of the board of FIG. 21; and FIG. 23 is a typical, partial end view of the platen employed in my process.

Figure 1:
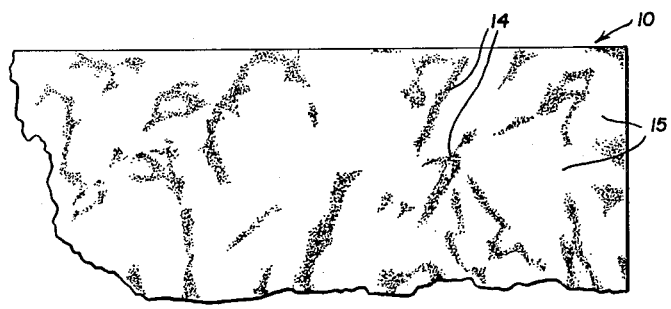
Figure 2:
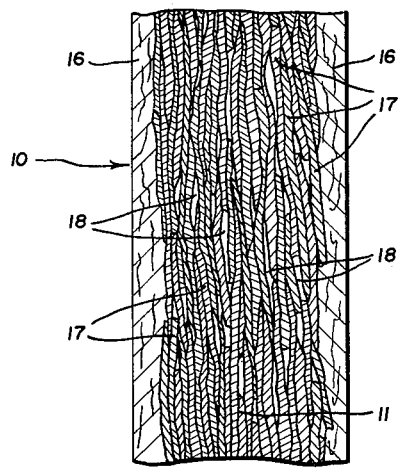
FIG. 2 is a view of an edge of the board of FIG. 1.

Referring to FIGS. 1 and 2, there is illustrated a board 10 having inherent ornamentation visible thereon, which is produced as follows: A suitable core 11 is formed of shavings of wood, which have been coated with any suitable adhesive, as will be presently described. The shavings are preferably from two to four inches long and are preferably about one thirtieth of an inch thick. The shavings are in a "moist" condition, by which I mean that they have more moisture than dry wood, preferably about that of green wood. For example, about thirty percent to forty percent moisture content is suitable. Slab wood from sawmills utilizing ponded logs may be formed into such shavings without further treatment. If kiln dried lumber scraps are utilized, the scraps are preferably water soaked for a number of hours before the shavings are formed, or the shavings may be formed and then sprayed or otherwise moistened with water so as to have the desired excess of water over that normally present in dry lumber. The shavings are then coated with a suitable adhesive in suitable amounts and deposited between suction-formed mats of fibers. The assembly is then compressed and consolidated to produce the finished board appearing in FIG. 1.

The ornamental appearance of the board is due to the varying density of the surface skin of consolidated fibers depending upon the presence or absence of elevated areas created by the shavings. In the areas indicated by the numeral 14 the fiber layer or skin is compacted to a high density, resulting in relative opaqueness or darker color as compared with the lighter areas 15 where the skin is relatively less dense. Thus, even though the skin is opaque throughout and obscures the shavings entirely, the visual impression of the shavings remains. In the consolidating action the entire assembly is subjected to heat and pressure between smooth platens or caul plates for sufficient length of time to evaporate the moisture and set the adhesive. The core 11 is relatively porous and the resulting steam can escape through the pores or interstices therein.

A board created in accordance with my process is shown in FIG. 2, which represents an edge of the board. The board, indicated generally by the numeral 10, is composed of a core 11 formed of consolidated shavings of wood and adhesive matter, and is provided on each surface with a compacted fiber layer indicated at 16, in which the surface impression of "flake" board design is present, as seen in FIG. 1. The board is characterized by the interlaced chips or shavings as indicated at 17, between which there are interconnected voids and passages as indicated at 18. The shavings throughout are preferably about two to four inches long, anywhere from a quarter of an inch to two inches wide, and about one thirtieth of an inch in thickness. The shavings are formed as previously described, having around thirty to forty per cent moisture content, and are sprayed or dusted with an adhesive, as will be described. The board is formed by laying down a mat of interlaced fibers, then sprinkling the shavings to a desired thickness thereon, then covering the assembly with a second mat of interlaced fibers, and then subjecting the entire assembly to heat and pressure between platens or caul plates as will be described. The steam which is formed during the compression of the board and setting of the adhesive escapes through the voids and passages in the core.

The board illustrated in FIG. 2 is formed by laying down a mat of interlaced fibers of desired thickness, for example about one-quarter of an inch thick, in the state of formation identified in the trade as a "wet mat." The fibers are deposited on a suction screen dipped into a thin slurry of fibers in water, the slurry being free of adhesives, to form a soft, pulpy mat containing approximately fifty percent by weight of water. The mat is laid on a caul plate, and the adhesive coated shavings are then deposited on the mat to a desired depth, for example to a depth of about six inches in order to form a three-quarter inch board, and then a second, adhesive-free, fiber mat about one-quarter of an inch thick is placed on top of the core of shavings. The core layer is therefore at least several times thicker than either of the mat units. The whole is then compressed in a hot press, stops being employed between the hot press platens so as to determine the thickness of the finished board within desired limits.

By the term "shavings" herein employed I mean slices of wood cut parallel to the fiber structure of the wood in the form of thin veneers about one-qarter of an inch to two inches wide, of any desired length, and preferably about one-thirtieth of an inch in thickness. Such shavings have considerable tensile strength. The shavings being in the "moist" condition defined above, inherently achieve two functions during the formation of the board. First, the shavings are sufficiently moist that an adhesive may be uniformly distributed over the surfaces of the shavings without being absorbed, and second, sufficient moisture is provided to plasticize the lignin and the adhesive when heated, and thus relieve internal stresses as will appear. Application of an adhesive powder is preferably accomplished by conveying the adhesive powder into a tumbling mechanism in which the shavings are lifted and dropped and rubbed against each other numerous times until a uniform coating is accomplished. With certain types of adhesive a fine spray of adhesive in liquid form may be employed, the shavings likewise being lifted and dropped and rubbed against each other until a uniform coating is achieved. The adhesive may be of any suitable type which is capable of being cured or set under heat and pressure. Adhesives which may be utilized are animal glues such as hide, bone and albumen glues, casein, protein adhesives such as soya bean flour, any of the various resoles or resin adhesives such as the numerous commercially available phenol or cresol formaldehyde resins, urea formaldehyde resins, melamine formaldehyde resins, Glyptal resins, alkyd resins and the like. The percentage of resin or other adhesive employed may vary from as little as two percent by weight to as high as twenty percent by weight, depending upon the desired characteristics of the resulting board. Sizing materials such as paraffin wax emulsions, and other additives such as fireproofing chemicals, vermin-proofing chemicals, fungicides and the like may be employed, either as a constituent of the adhesive, or as a separate material sprayed or conveyed into the tumbling mechanism. A mixture of various adhesives may be employed. The adhesive employed may very easily depend upon the availability and existing price of the various types.

Likewise, the choice of wood employed for forming the shavings may be dictated by the available supply, it being a further advantage of my process that the resulting board will have substantially the same characteristics whether any of the woods normally employed for producing lumber are used alone or in combination with others. Woods such as fir, balsam, pine, poplar, and any of the others commonly used as lumber, may be employed and will give essentially comparable results. Likewise, the wood may be an admixture of scraps of various types, such as would come from a furniture factory, without harmful effects. The shavings are preferably formed by presenting the narrow edge or a board of slab to a rotating chipper which creates slices of the desired thickness with the grain of the wood running the long way of the shavings. The shavings are preferably simultaneously cut into the desired length. A length of about two to about four inches gives good results, but longer pieces may be employed if desired. The width of the shavings is largely determined by the thickness of the boards or slabs presented to the shaving machine. During the tumbling of the shavings, and during the compression of the mass, the wider pieces of shavings may become split longitudinally so that the final appearance of the board gives the impression that shavings ranging in width from one-quarter to one-half of an inch in thickness are employed. However, it will be found that many of the shavings retain their original sizes.

The fiber mat may be formed from any suitable stock, such as groundwood or any of the various chemical pulps. A suitable source available to anyone is reclaimed waste paper. Newsprint may be employed, with obviously better results being achieved through the use of ledger or rag stock. A dye or other coloring material may be incorporated, bearing in mind that the more opaque the dye the less likely the interior pattern will be distinguishable on the surface of the finished board as illustrated in FIG. 1. It is to be appreciated that my invention embraces such opaque surfacing since a major aspect of my invention is the creation of a suitable board having a suitable surface. Certain boards or board substitutes which are intended for certain uses may be thus predyed or precolored, or may have a uniformly naturally brown color if the "flake" pattern is not required. A feature of my invention is that the "flake" appearance, or an entirely opaque surface, may be alternately created without changing the equipment and merely by altering the processing of the materials. For example, in the creation of some boards reclaimed newsprint may be employed without bothering to remove the ink. The cleaner and whiter the pulp the more pronounced the pattern effect will be.

After the assembly is placed between platens or caul plates for hot pressing, a major distinction of my process over those of the prior art comes into effect. A characteristic of boards formed in accordance with my invention is that the interior of the board or core employed is relieved of internal stresses and the fibers thereof are set in permanently stress-relieved condition by the particular treatment to which they have been subjected. In my process the materials are permitted to remain in contact with saturated steam for sufficient time and at a temperature such that the lignins and other hard substances of the wood or of the fibers are softened and the fibers are caused to slip with relation to each other into a condition of equilibrium.

The foregoing action is accomplished in a press, employing certain novel platens, by exposing the platens to a stream of a hot gas, such as hot air or the combustion products of a furnace, or air may be mixed with the combustion products of a furnace. It it desired that the initial temperature of the hot gas first contacting the material should be at a temperature of around seven hundred to nine hundred degrees Fahrenheit. The hot air may be produced by passing the combustion products of a burner through a heat exchanger so that clean air will be passed between the platens. The combustion products of the burner may be passed between the platens since the soot contained therein contacts only the exposed edges of the board, which edges are later trimmed off. In the event the particular fuel employed creates an excessive deposit of soot on the outer surfaces of the platen plates, conventional means may be employed to purify the combustion gases prior to their contact with the platens.

The press is so designed that much lower pressures than heretofore found possible may be employed, the pressures being in the order of approximately thirty pounds per square inch. Previously it has been found necessary to employ pressures of at least two hundred and fifty to three hundred pounds per square inch in order to consolidate particles of wood into boards having a specific gravity of approximately 0.6. Boards of the same density are produced in accordance with my process with pressures of thirty pounds per square inch, due to the process whereby the lignins are softened and the fibers of the shavings slip with respect to each other into a condition of stable equilibrium.

A feature of the resulting product particularly to be noted with respect to those boards employing a core made of shavings is that the harder portions of the shavings represented by the annual growth rings, run in the long direction of the shavings and are unbroken in the tumbling and handling processes. Most of them survive the pressing operation since the flat shavings tend to lie flat upon each other. These hard, strong ribs lie generally horizontally in all directions in the core, as clearly seen in FIG. 2, being bent to conform to adjoining shavings as illustrated. The shavings bridge the voids and produce a strong structure. Likewise, the tough skin produced by the fiber mat bridges the gaps between the outer shavings and fills the depressions between them, thus providing a strong structure having high skin strength. This result cannot be achieved by applying preformed paper or other fabrics to a core. Likewise, the adhesive employed cannot penetrate into preformed paper which is adhered to the core, so that board formed with preformed paper surfaces cannot have the high skin strength of boards formed in accordance with my process, and the paper tends to defoliate or slough off when exposed to weather. A further disadvantage is that even though a high percentage of resin or other binding material should be employed in the creation of preformed paper for use as a surfacing for board materials, the binding substances, having been previously set, do not allow the fibers to slip and adjust themselves, as in the case of my process.

It is to be appreciated that board formed as so far described may have a plain surface appearance since the pattern will be very indistinct. In order clearly to bring out the pattern, and further to improve the character of the board, it is desired that the surface skins be tempered by applying a drying oil thereto. Preferably the board is passed through a roller coating machine while it is still warm, although this may be accomplished after the board has cooled. Sufficient drying oil, such as linseed oil, tung oil, or any of the drying oils, may be employed and are applied to such an extent as to penetrate the surface skins. From four to ten percent by weight of dry fibers is satisfactory.

Figure 5:
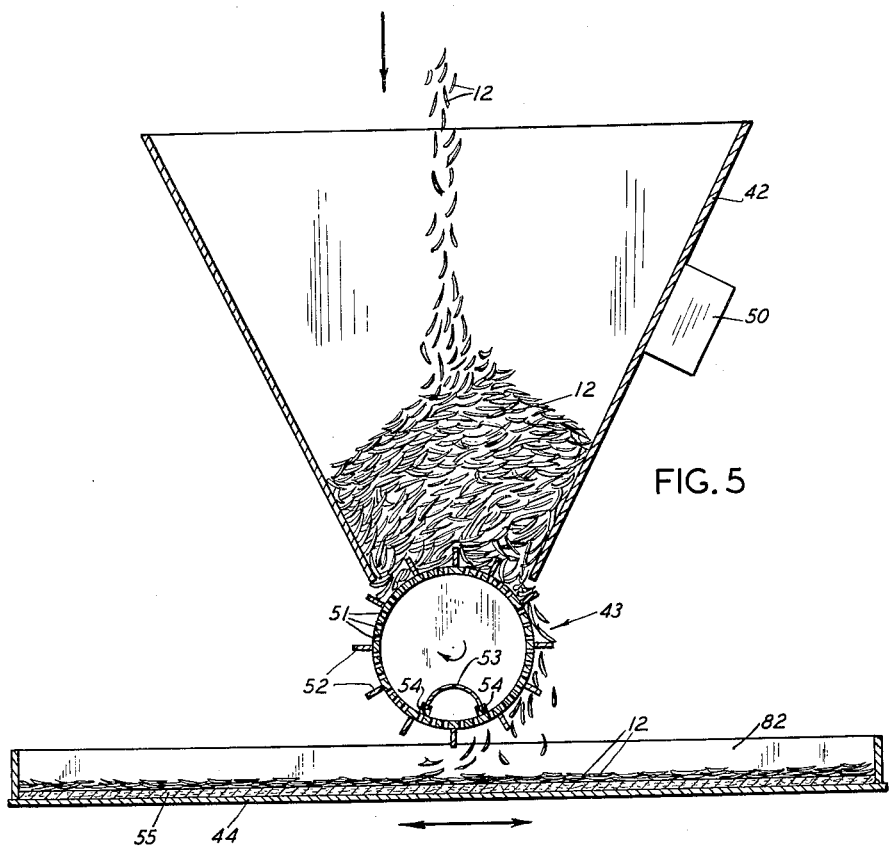
FIG. 5 is an enlarged, schematic representation of the equipment for spreading shavings uniformly in the manufacture of a board such as illustrated in FIGS. 1 and 2.
Figure 6:
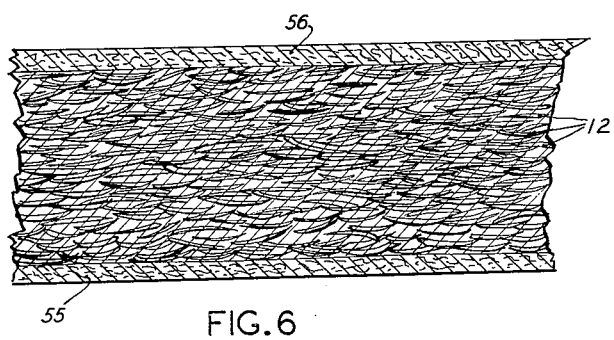
FIG. 6 is a typical section through the loose materials for manufacturing a board such as illustrated in FIG. 2, prior to consolidation thereof but drawn to a scale smaller than that of FIG. 2.

Equipment for fabricating boards in accordance with my invention is schematically illustrated in FIGS. 3 to 5, inclusive, 7 to 13, inclusive, and 23.

Referring to FIG. 3, there is illustrated a piece of scrap lumber 25 which is being presented to a rotary shaving head 26 having a pair of blades 27 arranged successively to cut slices from the edge of the board parallel to the grain, the head being provided with slots 28 into which the chips may pass and from which they drop onto conveying mechanism. The rotary head is preferably provided with a plurality of longitudinally spaced disc knives 29 which cut the slices into shavings of the desired lengths. The shavings 12 drop onto a traveling conveyor belt 31 which discharges them to the upper end of an elongated tumbling drum 32, which is preferably in the order of four feet in diameter by twenty-four feet long and inclined about one foot. The first four or five feet of the drum is provided with perforations 33 so that sawdust and other fine particles indicated at 34 may drop onto a conveyor 35 which deposits them in a bin 36 for other uses. The remaining shavings are successively lifted and dropped within the tumbling drum by a plurality of ribs 37. A liquid adhesive injecting device extends into the drum from the inlet and comprises a suitable head 38 for creating a mist or cloud of the desired adhesive, and a pump indicated at 39. The liquid adhesive is drawn from a tank 40 and forced through a metering valve 41 so that the desired proportion by weight of liquid adhesive is sprayed into the drum. Other materials such as sizes and the like may be injected through the same mechanism or a supplementary mechanism employed in the same relative position. The coated chips fall out of the outlet end of the tumbling drum into a hopper 42 at the lower end of which there is a spreading drum 43 for distributing the coated shavings on a reciprocating caul plate 44.

FIG. 4 illustrates a modification of the equipment which is employed for dry adhesives. The powdered adhesives are placed in a hopper 45, at the bottom of which there is a rotating metering device 46 which deposits a uniformly metered supply of dry adhesive on a continuous conveyor belt 47. The conveyor drops the adhesive into the interior of the drum beyond the perforations 33. The moist shavings 12 pick up the powdered adhesives and the tumbling of the shavings uniformly distributes the same as a moist coating over the entire surfaces of the shavings.

As seen in FIG. 5, the hopper 42 preferably is provided with steeply inclined walls which may be vibrated by an electromagnetic vibrator 50 so as to cause the chips to fall onto the surface of the drum 43. The drum is preferably provided with numerous small perforations 51 and is provided with a plurality of longitudinally extending ribs 52 which are spaced about six inches apart and stand up an inch or two from the surface of the drum. The shavings, even though coated with an adhesive, usually fall evenly, but in order to assure removal of the shavings, an air blast conduit 53 comprising an inverted trough is located near the bottom of the drum and is provided with gaskets 54 extending longitudinally of the lower edges thereof which engage the inner surface of the drum and cause the air to be directed downwardly through the perforations 51, thus blowing the chips off the roll.

In forming the board illustrated in FIG. 2, a wet mat 55 of pulp fibers, identified as the lower mat, is deposited on the caul plate 44 prior to positioning of the caul plate beneath the hopper 42. The caul plate is reciprocated beneath the hopper 42 a sufficient number of times to build up the desired thickness of shavings. In making the board illustrated in FIG. 2, the core layer of shavings 12 is approximately four inches thick, as deposited by the spreader drum. An upper wet mat 56 of fibers is then placed on the mass of shavings.

In the formation of a board as illustrated in FIG. 2, or in forming almost any board, the thickness of the fiber mats 55 and 56 is approximately one-quarter of an inch. Thinner mats would compress into skins too thin to have desired characteristics and would permit seepage of adhesive to the surfaces and thereby cause sticking of the boards to the caul plates during the hot pressing operation. Much thicker mats might not be penetrated by the adhesive to a sufficient extent during the hot pressing operation and would therefore be subject to flaking and swelling.

FIG. 7 schematically illustrates the mechanism for forming and depositing the fiber mats on the platen. A supply of pulp slurry, constantly maintained at desired consistency, is maintained in a pulp tank 60 midway between a pair of conveyors 61 and 62 upon which the caul plates 44 are supported. An overhead track 65 extends transversely of the arrangement and supports a suction head carriage 66 upon which a hydraulic ram 67 is vertically mounted. The ram comprises a cylinder and a downwardly extending piston 68 which supports a suction head 69 having a pulp screen 70 of the desired size, for example four feet by eight feet, in horizontal relation. The piston may be extended when the carriage 66 is centrally located so as to lower the screen 70 into the slurry, whereupon suction applied to the suction head 69, as represented schematically by a vacuum pump 71 and valve 72, will cause a deposit of fibers on the lower surface of the screen 70. Water which is drawn through the screen is conducted away by suitable means well known in the art (not shown). When the desired thickness of mat is built up, the ram is operated to elevate the suction head and the wet mat, which adheres thereto under suction, above the tank and above the level of the caul plates 44. The carriage 66 is then moved laterally to a position above the desired plate, either at one side or the other, the valve 72 is closed, and a blast of air admitted to the suction head 69 by a means schematically represented as a pump 73 and valve 74 whereby the wet mat is deposited on the caul plate, or on the material previously deposited on the caul plate, as the case may be.

A schematic plant layout is indicated in FIG. 8 wherein the pulp tank 60 is illustrated as being centrally located. The caul plates are moved about and arrested at successive positions, conveniently beginning with the position indicated by the numeral 80. At this position a previously finished board is removed, leaving the free caul plate 44 in position to commence a tour through the plant. The caul plate 44 is progressed to a position 81, at which position a rectangular frame 82 is automatically deposited on the caul plate to provide a receptacle in which to confine the shavings (FIGS. 3 and 5). The caul plate, and the frame supported thereon, is then moved forwardly and arrested at a rest station 83, serving no purpose other than to coordinate with other equipment. The next movement of the mechanism positions the caul plate and frame at the succeeding station 84 wherein the lower wet mat 55 is positioned within the frame by the mechanism illustrated in FIG. 7. The assembly is then moved forwardly to a position of rest at 85, again provided in order to synchronize with other equipment. From this position, the assembly is moved laterally to a position beneath the hopper 42 where the caul plate is reciprocated beneath the spreading drum 43 until the desired thickness of shavings is built up. The next movement is to a position of rest at 86, from which the caul plate commences to move back along the other side of the tank 60. The assembly is arrested at position 87 where the upper pulp mat 56 is deposited on top of the shavings. The next movement positions the assembled materials in a cold press at 88, which is operated in the usual manner to compress the mats and shavings to a thickness approaching the desired final thickness of the board. When the pressure is released the materials spring back to a slight degree, the overall thickness being, for example, approximately three-quarters of an inch to one inch for a one-half inch board. The next movement is arrested at station 89 where the frame 82 is automatically lifted from the assembly and transferred laterally of the plant to station 81 by mechanism to be described. The compressed mass, resting on the caul plate, is then moved forward to a position of rest at 90, then laterally onto an elevator 91. The caul plate bearing the cold-pressed material is then moved longitudinally into a stack press 92, to be subsequently described. In brief, the stack press forms a portion of the hot press, and the mass of material is progressed vertically upward in the stack press under compression and subjected to heat whereby it is consolidated into the final product. The caul plate and the finished board supported thereon are moved back onto the elevator 91 at the top of the press, lowered to the level of the station 80, and moved laterally onto the station 80 where the board is removed and the caul plate started through another cycle of movement.

Certain portions of the mechanism for accomplishing the above actions are more fully described as follows, commencing with the means for transferring the rectangular frames 82, which means are illustrated in FIGS. 10 and 11. It will be noted that the narrow ends of the frames 82 comprise channel bars 95 with their flanges projecting outwardly. A frame transfer track 96 extends laterally of the plant above the stations 81 and 89, the track being pivoted at 97 at a point widely spaced from the station 81. An upright piston 98 is mounted on the floor adjacent station 89, and a piston rod 99 cooperatively associated therewith is pivotally connected to the free end of the track 96 through a pivot indicated at 100. The arrangement is such that the track 96 may be tilted to inclinations above and below the horizontal. A wheeled carriage 101 is guided on track 96 and is free to roll by gravity in either direction depending upon the inclination of the track. A pair of claws 102 are fixed to the sides of the carriage and are so spaced that the tips thereof may enter the channel bars 95 to engage the upper flanges thereof upon elevation of the track and the carriage. The carriage is arrested at the end of its movement in either direction but abutments such as the abutment 103 illustrated in FIG. 10. The piston 99 is operated in synchronism with the conveyors, such as the conveyor 104 for progressing the cold pressed mat through station 89 and the conveyor 105 for progressing the caul plate through station 81. When the conveyor 104 is arrested, the piston 99 is retracted and the carriage rolls down to engage stop 103, the claws 102 freely entering the channels 95. The piston is now extended whereby the claws raise the frame 82 a considerable distance, thus clearing the cold-pressed mass of material. When the angle of inclination of the track 96 passes above the horizontal the carriage, supporting the frame 82, rolls back to the proper position above the conveyor 105 at station 81. When the conveyor 104 is again operated the mat is progressed to station 90 and a succeeding mat surrounded by a frame is brought forward. The piston 99 is now retracted, thereby causing the frame 82 to be lowered onto the empty caul plate and freeing the carriage 101 to roll laterally and position itself ready to elevate and transfer another frame.

The elevator 91 comprises a platform 110 which is mounted on the top of a long hydraulic lift piston 111 extending upwardly from a cylinder 112 buried in the ground beneath the floor of the plant, the platform having a movement in the order of thirty feet, for example. When the platform 110 is lowered suitable transfer means (not shown) are employed simultaneously to move a caul plate and finished board from the elevator to station 80 and a caul plate and cold pressed mat from station 90 onto the elevator. Immediately thereafter suitable means (not shown) are employed to move the caul plate and cold pressed mat longitudinally from the platform into the bottom of the stack press, as will be described. Following this the elevator is raised to its upper limit of movement, receives a caul plate and finished board from the top of the stack press and is then lowered to commence another cycle.

Referring to FIG. 12, the hot press is illustrated as comprising an open-top heating enclosure 115 through which the material is progressed by the stack press. Suitable means, such as an oil burner, heat exchanger, or the like are employed to create a hot gas at a temperature of approximately 750 to 950° F., which passes through a chamber 116 adjoining the enclosure 115 and in which a forced draft blower 117 is located. The blower exhausts into the lower portion of the chamber 115 immediately above the platform 118 of a stack elevating ram 119 including a plurality of simultaneously acting hydraulic pistons and cylinders. Gravity actuated dogs 120 at the sides of the platform 118 are arranged to drop in place to engage a platen 113 at the bottom of the stack press and support the entire stack of platens, caul plates and material sandwiched therebetween, as will be described. As will appear, each descent of the elevator platform 110 is effective to transfer a platen (FIG. 23) from the level of the top of the stack to the level of the bottom of the stack. The caul plate and finished board is removed to station 80, and a new caul plate and cold pressed material thereon is deposited on top of the platen which remains on the platform 110. The platen, together with the supported caul plate and cold pressed material, is added to the bottom of the stack through an opening 121 in the side of the chamber 115, when the ram platform 118 is lowered and the stack is supported by the dogs 120. The inserted platen engages the dogs 120 to move them aside when the ram 119 is elevated to add the new platen and cold pressed material to the bottom of the stack. As soon as the caul plate clears the upper ends of the dogs 120, they fall by gravity beneath the edges of the caul plate and engage the platen and support the stack.

At the top of the stack press there is provided a depending hydraulic ram 122 comprising a plurality of simulating hydraulic ram piston and cylinder devices supporting a head 123. Hydraulic fluid is supplied to the rams 119 and 122 from any suitable source of pressure (not shown) through interlocking controls and valves (not shown) whereby the following action takes place. When the ram 122 is extended, and the head 123 engaged with the top of the stack, a plurality of mechanically actuated dogs 124 which are engageable with the top caul plate of the stack, are actuated to swing away from the stack. The ram 122 applies pressure in the order of ten pounds per square inch which is effective on the uppermost, now consolidated, boards between platens and caul plates. The pressure on the lowermost, cold-pressed mat just introduced into the stack, is in the order of thirty pounds per square inch due to the weight of the stack of caul plates and platens thereabove. This pressure is resisted by the dogs 120. The lower ram 119 may be retracted to permit the insertion of a new platen, caul plate, and cold pressed mat, whereupon the ram 119 will be actuated to elevate the entire stack, swinging the dogs 120 out of the way until they drop into engagement with the newly inserted platen. The pressure supplied is sufficient to overcome the relatively weak resistance of the ram 122 and the weight of the intervening stack. When the uppermost platen, caul plate and finished board thereon have cleared the dogs 124, they are swung back mechanically to engage the next lower platen and thus arrest the stack and stop the upward movement thereof. The uppermost platen, caul plate thereon and finished board is now free to be moved onto the elevated platform 110. This is accomplished by suitable transfer mechanism which is not shown. The ram 122 is retracted to permit this transfer, and as soon as it has been accomplished, is extended to again engage the top of the stack and the dogs 124 are again retracted, whereupon another movement may be accomplished.

The platens employed in the hot press comprise a pair of parallel steel plates, an upper plate 125 and a lower plate 126, between which there are welded a plurality of vertical spacer plates 127 forming parallel, open-ended passages 128 through the entire interior of the platen.

When a suction formed mat is placed on a caul plate 44 the plate has cooled since it has traveled from station 80 to station 84, and it is considerably cooled in addition by the wet mat placed thereon. When the cool caul plate with the material thereon is placed on the platen resting on the elevator platform 110, heat begins to penetrate through the caul plate from the platen, which is still hot. When the ram 119 elevates the material into contact with the bottom of the next platen assembly, heat is transmitted from both sides into the material. In order that both surfaces of the material shall be subjected to heat being transmitted thereto at the same rate, and in order that exactly parallel smooth surfaces may be provided on the finished product, a duplicate of caul plate 44 is attached to the bottom of each of the platens, such caul plates being indicated at 129 and as being attached by bolts 130 and nuts 131.

When the material is presented to the stack press and initially subjected to pressure, the wet mats are immediately compressed almost to their finished thickness, as indicated at 133 in FIG. 13, but the cold-pressed shavings indicated at 134 resist the relatively low pressure encountered in the stack press. The heating chamber 115 extends upwardly only a fraction of the height of the stack, but for sufficient distance that the material of the core will become completely softened and slump into the final thickness of the finished product, this thickness being determined by a plurality of stops 132 removably mounted on the lower surfaces of the caul plates 129. The skins and the cores in final compressed thickness are indicated at 135 and 136, respectively, in FIG. 13, which state is reached within the confines of the chamber 115. This condition is brought about because the passages 128 are immediately aligned with the outlet of the blower 117 to conduct hot gases in contact with the platens whereby heat is transmitted through the caul plates into the material. The side of the chamber 115 opposite the blower 117 is provided with a plurality of curved plates 137 forming return bends, and the side of the chamber above the blower 117 is provided with similar plates 138 which are vertically staggered with respect to the plates 137. The hot gas is thereby shuttled back and forth through the hollow platens and upwardly within the chamber 115 at progressively diminishing temperatures, and is eventually conducted to a flue 139 which leads the gases to the atmosphere or to a heat exchanger. During the travel of the material upwardly through the stack press the pressure of the press progressively diminishes as the number of platens thereabove decreases, but sufficient pressure is constantly maintained to keep the stops 132 engaged with the caul plates 44. Residual heat in the platens is constantly transmitted to the material above the chamber 115, thereby completing the drying of the material and setting the lignins or other adhesive employed. The platen which is lowered on the elevator and returned to the stack press retains considerable heat so that most of the heat supplied to the hot press is utilized for treatment of the material rather than for heating cold platens, thus economizing on fuel consumption. It will be appreciated that the pressure is sufficient to cause the fibers of the material to slip and adjust themselves into stress relieved condition, and to cause the fibers of the mats to flow or be extruded into the low spots of the surfaces of the core, and that the range of temperatures encountered is such that final drying of the material and setting of the adhesive occurs after a state of complete equilibrium is achieved.

Figure 14:
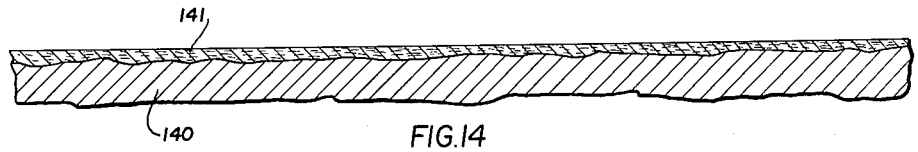
FIG. 14 is a schematic, partial vertical section through any form of board illustrating how the surface skin is molded to the rough surface of the board and provides a smooth surface therefor.

The description of the product and process of forming the same has heretofore been limited to a core formed from shavings, but it is to be appreciated that the equipment and process is of equal utility in forming durable skins on wooden pieces previously formed in some other manner and used as cores, and in forming plywood surfaced with fiber skins. For example, previously formed plywood veneer sheets, or similar wood sheets, may be surfaced in accordance with the present invention. In such instances the sheets are moistened, coated with adhesive, deposited on the lower wet mat at stations 85 or 86, and the process continued as previously described to form a sandwich of the preformed sheets between wet mats of fibers. As previously described, a board having superior qualities is thus formed, since the fibers of the sheets are softened and adjust themselves to better conditions of equilibrium and then reset in position, with durable surface skins adhered thereto. Such a board is indicated schematically in FIG. 14 in magnified cross section wherein a portion of a suitable core is indicated at 140 and a fiber skin 141 is adhered thereto. The rough surface of the board has now been surfaced with a smooth surfaced, durable skin which takes decorative liquids without raising and in a uniform manner. The adhesive applied to the surface of the sheets has penetrated into the skin material to form a hard finish. Tempering of such a board as previously described brings out the pattern effect of the grain of the wood in the same manner as previously described, since the skin is compressed to greater opacity over the hard grain portions of the wood.

Figure 15:
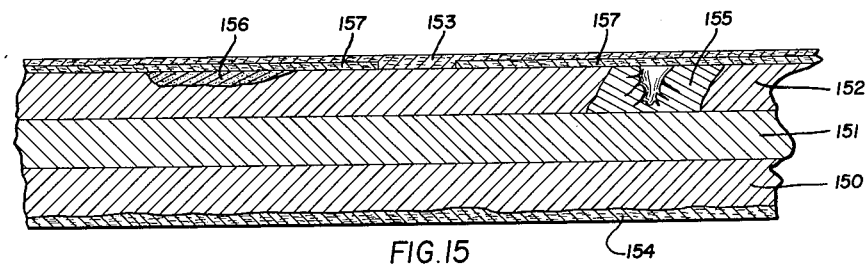
FIG. 15 is a typical section through a plywood panel formed in accordance with the present invention and illustrating features thereof.

Veneer sheets for forming plywood may be superimposed on each other between wet mats of fiber, with thermosetting adhesive on the surfaces of the veneer sheets, with or without a sprinkling of adhesive bearing shavings between one or both of the outermost veneer sheets and the wet mats. Thus a plywood panel having the desired surface characteristics may be formed in one operation. The foregoing has the advantage that the veneer sheets may be utilized as they come from the veneer slicing machine, without the step of drying the veneer sheets prior to laying them up, and with a minimum of handling since there is no necessity for distinguishing between the "face" and "back" sides of the veneer sheets. Likewise, poor quality sheets with excessive pitch pockets and knots or knotholes or other defects may be utilized, depending upon the surface skins and possible deposited shavings to bridge the gaps or otherwise cover defects. An advantage of forming a plywood panel in this manner is that the cellulosic material within the veneer sheets is softened and the fibers caused to slip and adjust themselves to positions of internal equilibrium during the pressing operation, so that the resulting product is relieved of internal stresses and will have a minimum tendency to warp. Such a board is illustrated in FIG. 15 wherein a plurality of veneer plies 150, 151, and 152 are shown as having been consolidated together with surface skins 153 and 154. The sheets are provided with adhesive on both surfaces and laid up in moist condition just as they come from the veneer slicing machine. By way of example, the sheet 152 is illustrated as having a knot 155 therein and an exposed pitch pocket 156. The surface skin 153 alone may be sufficient to obscure such defects, but in the illustration a plurality of shavings 157 formed as previously described for forming a core, have been sprinkled over this one surface. The shavings bridge the gaps and prevent the formation of soft spots in the surface of the finished board, and completely obscure the defects. The surface skin 154 is provided in order to equalize tensions on both sides and to minimize any tendency to warp, absorb moisture and swell.

In those modifications in which the core consists of boards, or veneer sheets, steam formed from the water contained in the wet mats may escape from the edges of the assemblies not only through any spaces which might exist between such components, but also through passages formed by checks, cracks and the porous, cellular structure of the wood. These extend lengthwise of the boards or sheets, that is, parallel with the grain throughout the core.

Figure 16:
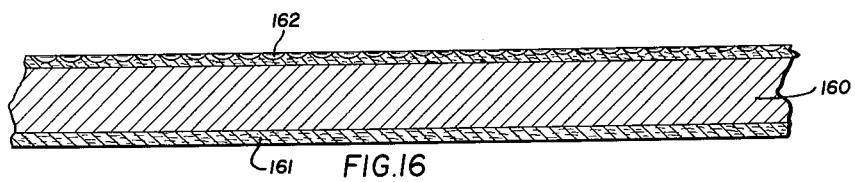
FIG. 16 is a schematic cross section through a typical board having both sides surfaced in accordance with the present invention, but one side being formed with wire marking for certain purposes.

In FIG. 16 a core indicated at 160 may comprise any of the previously described cores, this figure illustrating the possibility of producing a board having a smooth skin on one side, as indicated at 161, and a wire marked skin 162 on the other side. This is produced by placing a screen between the wet mat and the adjacent caul plate in the hot press, such as by depositing a screen on the assembly on the lowered elevator platform prior to insertion in the hot press. Of course, either or both sides of the product may be so wire marked, but it is preferable to have one side smooth and one side wire marked so that a reversible panel for optional use is thus produced.

Figure 17:
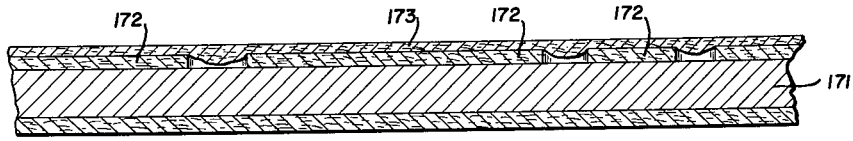
FIG. 17 is a schematic cross section through a typical board having both sides surfaced in accordance with the present invention and illustrating a further detail.

In FIG. 17 I have illustrated the fact that a decorative pattern may be created on the core panel 171 by the use of decorative elements 172 scattered over a surface and covered with a surface skin 173, in which the thickness of the elements 172 is considerably greater than one-thirtieth of an inch. In such case the elements 172 would be surfaced or impregnated with adhesive and would bond the surface skin to the core, the fibers of the mat being depressed into the gaps between the spaced elements and, even though not contacting the core 171, providing a durable board of decorative appearance as previously described.

Figure 18:
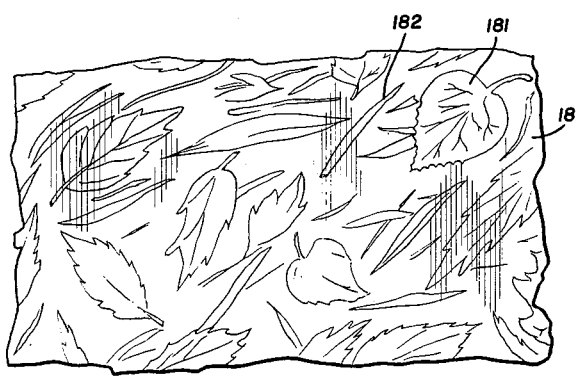
FIG. 18 is a partial plan view of a board illustrating a typical ornamentation possible in accordance with the present invention.

In FIG. 18 a board formed as previously described is shown at 180, the board having applied thereto decorative elements such as tree leaves 181 and blades of grass 182. By the application of a relatively thin surface skin, such relatively thin, decorative elements may be caused to effect the pattern appearance illustrated, the ribs of the leaves showing through as darkened area set off by lighter areas. The leaves employed in such case may be dried or partially dried, and should be thoroughly coated or impregnated with a relatively large amount of adhesive so as practically to solidify the leaf and achieve a firm bond throughout the assembly. It is to be appreciated that other decorative items may be employed to form a design of any desired suitable character. For example, shavings may be cut by means of dies into various shapes, or various shapes may be punched from thin sheets of veneer to form the decorative elements, or various shapes may be punched from sheets of cardboard heavily impregnated with a thermosetting resin in uncured or partially cured state.

In FIGS. 19 and 20 I have illustrated a board reinforced with hardware cloth, otherwise described as woven wire screening. The hardware cloth is exemplary of various types of open mesh fabrications of metal wire which can be utilized to form a reinforced board, and which is resistant to the attacks of gnawing vermin. In this instance a core 180, formed as previously described or constituting any preformed panel, has the metal strands in woven form applied thereto, the strands being indicated at 181. The hardware cloth or screening is sandwiched between the core 180 and the wet mats for forming the surface skins 182. It will be appreciated that a mat of sufficient thickness to provide a smooth surface without ridges of the wire therebetween is preferably utilized in this instance. The greater consolidation of the fibers of the mat over the wires produces the pattern effect indicated at 183.

Similarly, as illustrated in FIGS. 21 and 22, a core 190 may have a desired fabric 191 of finer mesh, and formed of such materials as burlap, window screening, woven glass threads and the like applied thereto and imbedded in the surface skins 192. A patterned effect such as indicated at 193 may thus be created.

It is to be understood that the present invention is not to be restricted to any particular type of core material, and in the claims appended hereto, I intend by the usage of the term "coarse components" to mean relatively large wooden pieces, that is, relatively large size, rough wooden components which have been proposed herein for composite boards or boardlike products. The term therefore is intended to embrace wood shavings, wood chips, wood slices, wood veneer flakes, and loose wood veneer sheets or flitches. Inasmuch as the invention is particularly suitable for use with core materials providing a rough or uneven surface, such other materials as hardware cloth, screening, burlap or the like may be provided between the core and the wet mats forming the surface skins.

Apparatus disclosed in the instant application is covered in my copending continuation-in-part application Serial No. 664,314, filed June 7, 1957, now abandoned, entitled "Board Forming Press and Method of Making Board Substitute." Reference is also made to my copending applications Serial No. 573,897, filed March 26, 1956, now Patent No. 2,947,654 issued August 2, 1960, entitled "Composite Board Product and Method of Manufacture," and Serial No. 697,030, filed November 18, 1957, entitled "Board Products and Process of Making the Same," all of which applications are continuations-in-part of Serial No. 487,753, the parent of the instant continuation application.

Having illustrated and described the various aspects of my present invention, it should be realized by those skilled in the art that the same permits of various modifications in arrangement and detail. All such modifications as come within the true spirit and scope of the appended claims are considered to be a part of my invention.

I claim:

1. The method of forming a board product comprising preparing a first aqueous slurry-formed loosely felted, wet mat unit of interlaced cellulosic fibers having a moisture content of at least about fifty percent based on the dry weight of the fibers whereby the resultant mat unit is soft and pulpy, dusting a coating of dry adhesive powder onto discrete moist coarse wooden components, the components having both width and length many times greater than the thickness thereof, the grain of said components extending longitudinally thereof, said components having a moisture content of only about that of green wood, assembling upon said first mat unit while in said wet, soft and pulpy condition, a substantially pulp free core layer consisting of said coated components in loose form, said components being arranged in a position substantially parallel with respect to each other and to said mat whereby the grain of said components extends substantially parallel with said mat, the grain of some of the components extending in a different direction from that of other of the components, placing a second wet mat unit prepared the same as said first mat unit over the upper surface of said core layer, the opposite surfaces of said core layer being rough, uneven and having depressions therein, compressing the assembled mat units and core between platens whereby the fibers are extruded from the pulpy mat units into the depressions in the adjacent core surface substantially filling the same, smooth surfaced means being arranged next adjacent each of the outer surfaces of said mat units throughout the compression of said assembly, said coarse components of said core layer forming escape passages throughout the drying cycle for steam extending to the lateral edges of the assembly, maintaining the assembled mat units and core layer under pressure between said platens at an elevated temperature for a sufficient length of time to set the adhesive and to dry the assembly, said pressure being insufficient to cause closure of said passages, whereby both of said mat units are transformed into similar dense, tough and smooth surfaced skins firmly bonded to said core layer.

2. The method as set forth in claim 1 in which the core is built up of a plurality of layers of loose veneer sheets dusted with a dry adhesive powder and with the grain of the wood of alternate layers extending at substantially right angles to each other.

3. The method of forming a board product comprising preparing a first aqueous slurry-formed loosely felted wet mat unit of interlaced cellulosic fibers whereby the resultant mat unit is soft and pulpy, applying a coating of adhesive onto discrete, coarse wooden components, the components having both width and length many times greater than the thickness thereof, said components having a moisture content of only about thirty to fifty percent based on the dry weight of the components, the grain of said components extending longitudinally thereof, assembling upon said first mat unit while in said wet, soft and pulpy condition, a substantially pulp free core layer of said components extending flatwise in such a manner that the grain thereof extends substantially parallel with said mat, the grain of some of the components extending in a direction different from that of adjacent components, placing a second mat unit prepared the same as said first mat unit over the upper surface of said core layer, the opposite surfaces of said core layer being rough, uneven and having depressions therein, compressing the assembled mat units and core between platens whereby the fibers are forced from the pulpy mat units into the depressions in the adjacent core surface substantially filling the same, smooth surfaced means being arranged next adjacent each of the outer surfaces of said mat units throughout the compression of said assembly, said coarse components of said core layer forming escape passages throughout the drying cycle for steam from said mat units extending to the lateral edges of the assembly, maintaining the assembled mat units and core layer under pressure between said platens at an elevated temperature for a sufficient length of time to set the adhesive and to dry the assembly, said pressure being less than that which will cause closure of said passages, whereby both of said mat units are transformed into tough, smooth surfaced skins firmly bonded to said core layer.

4. The method of making a composite board product comprising slicing moist wood parallel with the grain into a plurality of thin wood flakes ranging up to several inches in width and several inches in length, dusting said veneer flakes with soya bean powder, forming a pair of wet blankets from a thin slurry of cellulosic fibers in water, reducing by suction the free water content of said blankets without appreciable compression thereof whereby said blankets are still wet and spongy, smoothly laying down one of said blankets while still spongy and wet with the water from said slurry, piling upon said one blanket said dusted flakes in random orientation of grain direction to a depth of several inches, smoothly spreading a second blanket while still spongy and wet with the water from said slurry over said flakes to form an assembly, applying pressure to said assembly uniformly while heating the same to above the boiling point of water but below the charring point of paper for a sufficient length of time to soften the veneer flakes, flat smooth surfaced means being arranged next adjacent each of the opposite surfaces of said assembly during the compression thereof, said flakes forming escape passages for steam from said wet blankets extending to the lateral edges of the assembly, the opposite surfaces of the layer of flakes being rough and uneven and having depressions therein, fibers from said blankets being extruded into said depressions substantially filling the same and maintaining compression thereof while permitting the adhesive and fibers to set and form a stable product, said blankets being transformed into dense hard skins firmly bonded to the flakes next adjacent thereto, and having smooth outer surfaces.

5. The method of forming a board product comprising preparing a first aqueous slurry-formed loosely felted wet mat of interlaced cellulosic fibers whereby the resultant mat is soft and pulpy, said mat having a moisture content of at least 50 percent, assembling upon said first mat while in said wet, soft and pulpy condition, a substantially pulp free core layer of moist relatively coarse wooden components coated with an adhesive powder, said components having a moisture content only about that of green wood, placing a second wet mat prepared the same as said first mat over the upper surface of said core layer, the opposite surfaces of said core layer being rough, uneven and having depressions therein, said core layer being at least several times thicker than either of said mats, compressing the assembled mats and core between platens whereby the fibers are extruded from the pulpy mats into the depressions in the adjacent core surface substantially filling the same, flat smooth surfaced means being arranged next adjacent each of the opposite surfaces of said assembly during the compression thereof, said coarse components of said core layer forming escape passages throughout the drying cycle for steam extending to the lateral edges of the assembly, maintaining the assembled mats and core layer under pressure between said platens at an elevated temperature for a sufficient length of time to set the adhesive and to dry the assembly, whereby said mats are transformed into dense, hard and tough surface skins firmly bonded to the coarse components of said core layer, and having smooth outer surfaces.

6. The method of forming a board product comprising vacuum-forming a first loosely felted wet mat from a thin slurry of cellulosic fibers in water, spreading said mat upon a smooth flat plate without appreciable compression of the mat whereby the mat is still wet and pulpy, assembling upon said first mat while in said wet, pulpy condition, a substantially pulp free core layer of loose, relatively coarse wooden components coated with adhesive, said core components having a moisture content only about that of green wood, placing a second mat prepared the same as said first mat over the upper surface of said core layer, said core layer being at least several times thicker than either of said mats, the opposite surfaces of said core layer being rough, uneven and having depressions therein, transferring said plate and superposed assembly of mats and core layer to a hot press, compressing the assembled mat and core between platens with a smooth flat plate surface next adjacent the upper mat surface whereby the fibers are extruded from the pulpy mats into the depressions in the adjacent core surface substantially filling the same, said coarse components of said core layer forming escape passages throughout the drying cycle for steam extending throughout the interior of the core layer to the lateral edges of the assembly, maintaining the assembled mats and core layer under pressure between said platens at an elevated temperature for a sufficient length of time to set the adhesive and to dry the assembly and to transform said mats into dense, hard and tough skins firmly bonded to the coarse components of said core layer, and having smooth outer surfaces.

7. The method of forming a board product comprising preparing a first aqueous slurry-formed loosely felted mat unit of interlaced cellulosic fibers saturated with water to approximately 50 percent by weight whereby the resultant mat unit is soft and pulpy, assembling upon said first mat unit while in said wet, soft and pulpy condition, a substantially pulp free core layer of relatively coarse moist wooden components coated with adhesive, placing a second mat unit prepared the same as said first mat unit over the upper surface of said core layer, the opposite surfaces of said core layer being rough, uneven and having depressions therein, said core layer being at least several times thicker than either of said mat units, compressing the assembled mat units and core between platens whereby the fibers are extruded from the pulpy mat units into the depressions in the adjacent core surface substantially filling the same, flat smooth surfaced means being arranged next adjacent each of the opposite surfaces of said assembly during the compression thereof, said coarse components of said core layer forming escape passages throughout the drying cycle for steam extending to the lateral edges of the assembly, maintaining the assembled mat units and core layer under pressure between said platens at an elevated temperature for a sufficient length of time to set the adhesive and to dry the assembly, whereby said mat units are transformed into dense, hard and tough surface skins firmly bonded to the coarse components of said core layer, and having smooth outer surfaces.

8. The method of forming a board product comprising preparing a first aqueous slurry-formed loosely felted mat unit of interlaced cellulosic fibers, spreading said mat unit without appreciable compression whereby said mat unit remains wet, soft, and pulpy, assembling upon said first mat unit while spread in said wet, soft and pulpy condition, a substantially pulp free core layer of relatively coarse moist wooden components coated with adhesive, spreading a second mat unit prepared the same as said first mat unit over the upper surface of said core layer, the opposite surfaces of said core layer being rough, uneven and having depressions therein, said core layer being at least several times thicker than either of said mat units and having a moisture content on a percentage of unit volume basis substantially less than that of the mat units, compressing the assembled mat units and core between platens whereby the fibers are extruded from the pulpy mat units into the depressions in the adjacent core surface substantially filling the same, flat smooth surfaced means being arranged next adjacent each of the opposite surfaces of said assembly during the compression thereof, said coarse components of said core layer forming escape passages throughout the drying cycle throughout the core layer for steam extending to the lateral edges of the assembly, maintaining the assembled mat units and core layer under pressure between said platens at an elevated temperature for a sufficient length of time to set the adhesive and to dry the assembly, said pressure being less than that which will cause closure of said passages and prevent escape of steam from the edges of said core layer, whereby said mat units are transformed into dense, hard and tough surface skins firmly bonded to the coarse components of said core layer, and having smooth outer surfaces.

References Cited in the file of this patent

UNITED STATES PATENTS

| | | |
|---|---|---|
| 660,644 | Leaver | Oct. 30, 1900 |
| 988,254 | Criswell | Mar. 28, 1911 |
| 1,009,790 | Ross | Nov. 28, 1911 |
| 1,125,445 | Beadle | Jan. 19, 1915 |
| 1,663,505 | Mason | Mar. 20, 1928 |
| 1,995,145 | Frost | Mar. 19, 1935 |
| 2,658,847 | Macdonald | Nov. 10, 1953 |
| 2,761,487 | Ware | Sept. 4, 1956 |

FOREIGN PATENTS

| | | |
|---|---|---|
| 2,327 | Great Britain | 1898 |
| 120,157 | Great Britain | Oct. 31, 1918 |
| 644,564 | Great Britain | Oct. 11, 1950 |